United States Patent
Sato et al.

(10) Patent No.: US 8,248,759 B2
(45) Date of Patent: Aug. 21, 2012

(54) CAPACITOR

(75) Inventors: Masayuki Sato, Osaka (JP); Yukiyasu Sugihara, Kyoto (JP); Yasuyuki Ito, Osaka (JP); Nario Niibo, Osaka (JP)

(73) Assignee: Panasonic Corporation, Osaka (JP)

( * ) Notice: Subject to any disclaimer, the term of this patent is extended or adjusted under 35 U.S.C. 154(b) by 291 days.

(21) Appl. No.: 12/834,142

(22) Filed: Jul. 12, 2010

(65) Prior Publication Data

US 2011/0019338 A1    Jan. 27, 2011

(30) Foreign Application Priority Data

Jul. 21, 2009  (JP) ................. 2009-169873
Oct. 30, 2009  (JP) ................. 2009-249773

(51) Int. Cl.
*H01H 9/08* (2006.01)
*H01H 9/12* (2006.01)
*H01G 4/236* (2006.01)
*H01G 4/228* (2006.01)

(52) U.S. Cl. ........ 361/520; 361/500; 361/502; 361/517; 361/518; 361/519; 361/535; 361/536; 361/537; 361/538

(58) Field of Classification Search .......... 361/500, 361/502, 517–520, 535–538
See application file for complete search history.

(56) References Cited

U.S. PATENT DOCUMENTS

| | | | | |
|---|---|---|---|---|
| 4,255,779 A | * | 3/1981 | Meal | 361/308.1 |
| 4,882,115 A | * | 11/1989 | Schmickl | 361/538 |
| 5,093,762 A | * | 3/1992 | Sato et al. | 361/502 |
| 5,432,672 A | * | 7/1995 | Kuriyama et al. | 361/534 |
| 6,816,358 B2 | * | 11/2004 | Kida et al. | 361/540 |
| 6,891,716 B2 | * | 5/2005 | Maier et al. | 361/523 |
| 7,248,460 B2 | | 7/2007 | Omura et al. | |
| 7,262,955 B2 | * | 8/2007 | Ishida et al. | 361/540 |
| 7,656,647 B2 | * | 2/2010 | Edson et al. | 361/540 |
| 7,706,132 B2 | * | 4/2010 | Kawahito et al. | 361/523 |
| 7,835,139 B2 | * | 11/2010 | Ozawa et al. | 361/523 |
| 8,116,068 B2 | * | 2/2012 | Nishimura | 361/523 |
| 2006/0291143 A1 | * | 12/2006 | Matsuoka | 361/538 |
| 2007/0019366 A1 | * | 1/2007 | Yamaguchi et al. | 361/540 |
| 2008/0232027 A1 | * | 9/2008 | Ozawa et al. | 361/311 |
| 2009/0181297 A1 | * | 7/2009 | Ashizaki et al. | 429/161 |
| 2009/0296318 A1 | * | 12/2009 | Kawahito et al. | 361/540 |

(Continued)

FOREIGN PATENT DOCUMENTS

JP          01291417 A  *  11/1989

(Continued)

OTHER PUBLICATIONS

Ashizaki et al; U.S. Appl. No. 12/688,954, filed Jan. 18, 2010.

*Primary Examiner* — Anatoly Vortman
(74) *Attorney, Agent, or Firm* — Pearne & Gordon LLP (57) ABSTRACT

A capacitor has a capacitor element, an open-topped case on which terminals joined to a pair of electrode lead sections of the capacitor element are disposed facing each other, and a cover combined with the open surface of the case. Each terminal has a pair of intermediate conductive sections and a pair of terminal sections. The joint has a joint surface to which one of the electrode lead sections of the capacitor element is joined. The intermediate conductive sections are L-shaped, and are extendedly disposed in directions opposite to each other from both ends of the joint. The terminal sections are disposed further extendedly from the intermediate conductive sections and placed symmetrically about the joint.

6 Claims, 7 Drawing Sheets

U.S. PATENT DOCUMENTS

| | | | |
|---|---|---|---|
| 2011/0085283 A1* | 4/2011 | Park et al. | 361/502 |
| 2011/0102972 A1* | 5/2011 | Jung et al. | 361/502 |
| 2011/0128673 A1* | 6/2011 | Lee et al. | 361/502 |
| 2011/0170235 A1* | 7/2011 | Lee et al. | 361/502 |
| 2011/0182003 A1* | 7/2011 | Oshima | 361/532 |
| 2011/0317331 A1* | 12/2011 | Lee et al. | 361/502 |

FOREIGN PATENT DOCUMENTS

| | | |
|---|---|---|
| JP | 2004-356462 A | 12/2004 |
| JP | 2010219183 A * | 9/2010 |

* cited by examiner

CAPACITOR

BACKGROUND OF THE INVENTION

1. Field of the Invention

The present invention relates to a capacitor used for assisting power sources of various types of electronic, electric, and mobile devices.

2. Background Art

In recent years, a large number of electric double layer capacitors with a small size and large capacity have been used as capacitors for backing up a microprocessor, memory, and timer; and for assisting various types of power sources. An electric double layer capacitor accumulates energy in an electric double layer formed at an interface between the polarizable electrode and electrolyte.

Figure 7A:
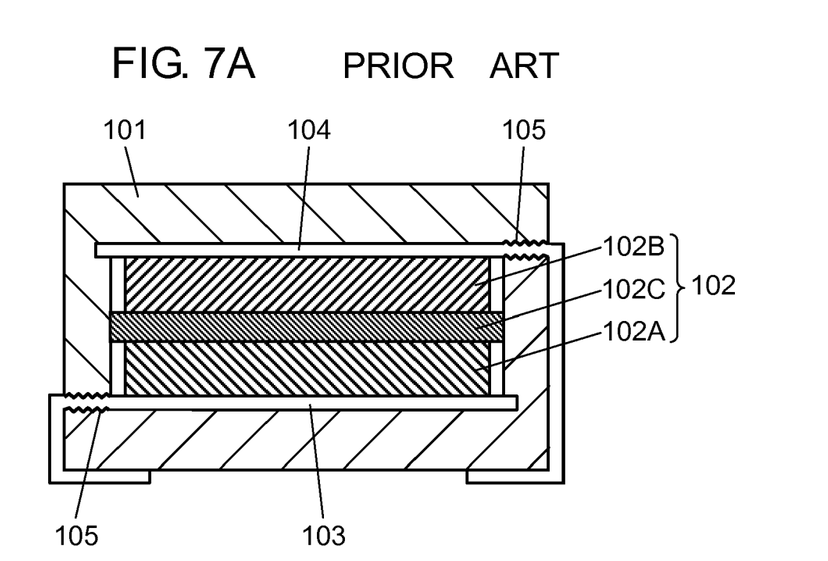
FIG. 7A is a sectional view of a conventional capacitor.
Figure 7B:
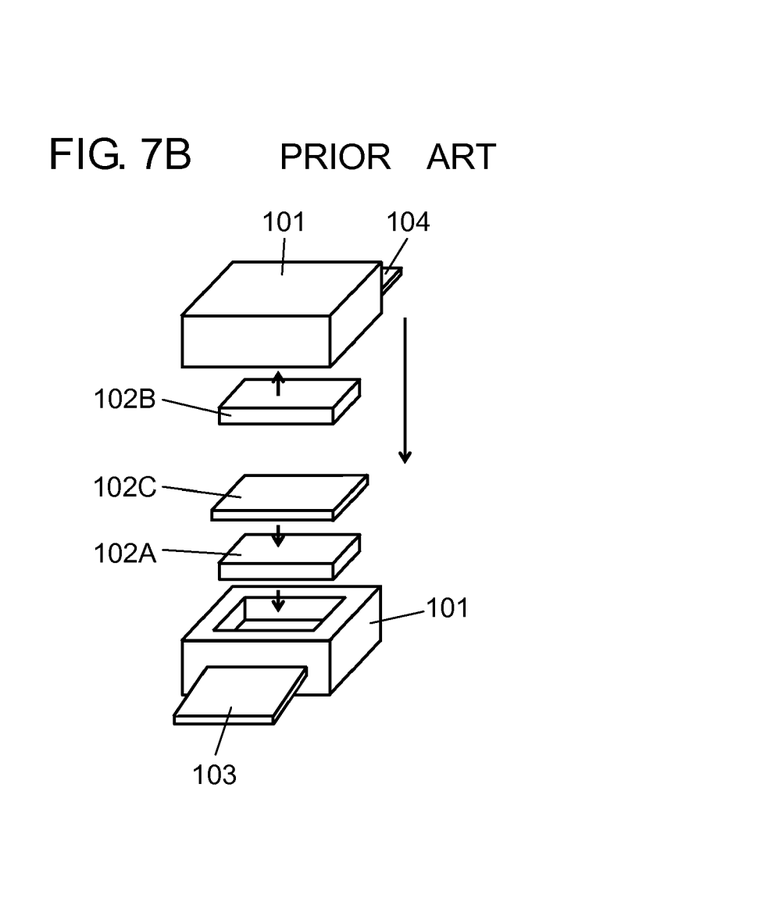
FIG. 7B is an exploded perspective view of the capacitor shown in FIG. 7A.

FIGS. 7A and 7B are respectively a sectional view and an exploded perspective view of a conventional electric double layer capacitor. The capacitor includes case 101, capacitor element 102, positive electrode terminal 103, and negative electrode terminal 104. Case 101 is formed of, for example, insulative resin or ceramic. Capacitor element 102 is formed of positive electrode 102A, negative electrode 102B, and separator 102C which are laminated. Capacitor element 102 together with an electrolyte (not shown) is contained inside case 101. A first end of positive electrode terminal 103 is connected to positive electrode 102A, and a first end of negative electrode terminal 104 is connected to negative electrode 102B. A second end of terminal 103 and a second end of terminal 104 are drawn outside penetrating through a wall of case 101. In FIG. 7B, terminal 103 and terminal 104 are in a state before being bent along the outer surface of case 101, namely in a plain plate.

Thus, with this electric double layer capacitor, positive electrode terminal 103 and negative electrode terminal 104 are drawn outside penetrating through case 101. In this structure, an electrolyte inside case 101 is likely to leak outside through gaps between each terminal and through holes of case 101. For this reason, a part of the wall of case 101 through which terminals 103 and 104 penetrate is roughened. In this way, rough-surfaced part 105 formed at a position where terminals 103 and 104 contact case 101 increases adherence between case 101 and each terminal and enlarges the contact area. This structure reduces the possibility that an electrolyte leaks outside.

An electric double layer capacitor, however, generates a large amount of gas inside case 101 while being used. In this way, an increase in the inner pressure of case 101 can cause exfoliation at a part (rough-surfaced part 105) where terminals 103 and 104 contact case 101. Consequently, an electrolyte is still likely to leak outside through gaps between each terminal and case 101.

In detail, the following mechanism works. That is, an increase in the inner pressure of case 101 causes case 101 to expand vertically to be deformed. Consequently, the top and bottom surfaces of case 101 undergo an outward-expanding stress, resulting in the side of case 101 warped outside more largely at its rim than its substantially central part. The interface between case 101 and terminals 103, 104 undergoes a stress in a direction in which case 101 exfoliates from terminals 103, 104, which produces gaps at the interface between case 101 and terminals 103, 104 (both are made of different materials). The electrolyte contained in case 101 is likely to enter these gaps and to gradually leak from the inside to the outside of case 101.

Particularly with recent electric double layer capacitors, flat and relatively thin capacitor elements are used and the wall thickness of case 101 is thinned for downsizing and lower profile. In such a case, case 101 is deformed more prominently, and thus an electrolyte leaks easily.

SUMMARY OF THE INVENTION

A capacitor of the present invention includes a capacitor element having a pair of electrode lead sections; an electrolyte impregnated in the capacitor element; a resin-made case; a cover; and a pair of terminals. The case has an inner bottom and an open surface facing the inner bottom to contain the capacitor element and electrolyte. The cover is combined with the open surface of the case. Each of the pair of terminals is joined to an electrode lead section of the capacitor. Each of the pair of terminals has a joint, first and second intermediate conductive sections, and first and second terminal sections. The joint has a joint surface to which one of the electrode lead sections of the capacitor element is joined. First and second intermediate conductive sections are L-shaped, and are extendedly disposed in directions parallel with the joint surface and opposite to each other from both ends of the joint. The first terminal section is disposed further extendedly from the first intermediate conductive section. The second terminal section is disposed further extendedly from the second intermediate conductive section and symmetrically to the first terminal section about the joint. In the case, the joint surface of the joint is disposed closer to the open surface than to the inner bottom of the case and exposed from the case toward the open surface. The rim of the joint and the first and second intermediate conductive sections are embedded in the case, and the first and second terminal sections are partially guided outside from the case.

DETAILED DESCRIPTION OF THE INVENTION

Figure 1:
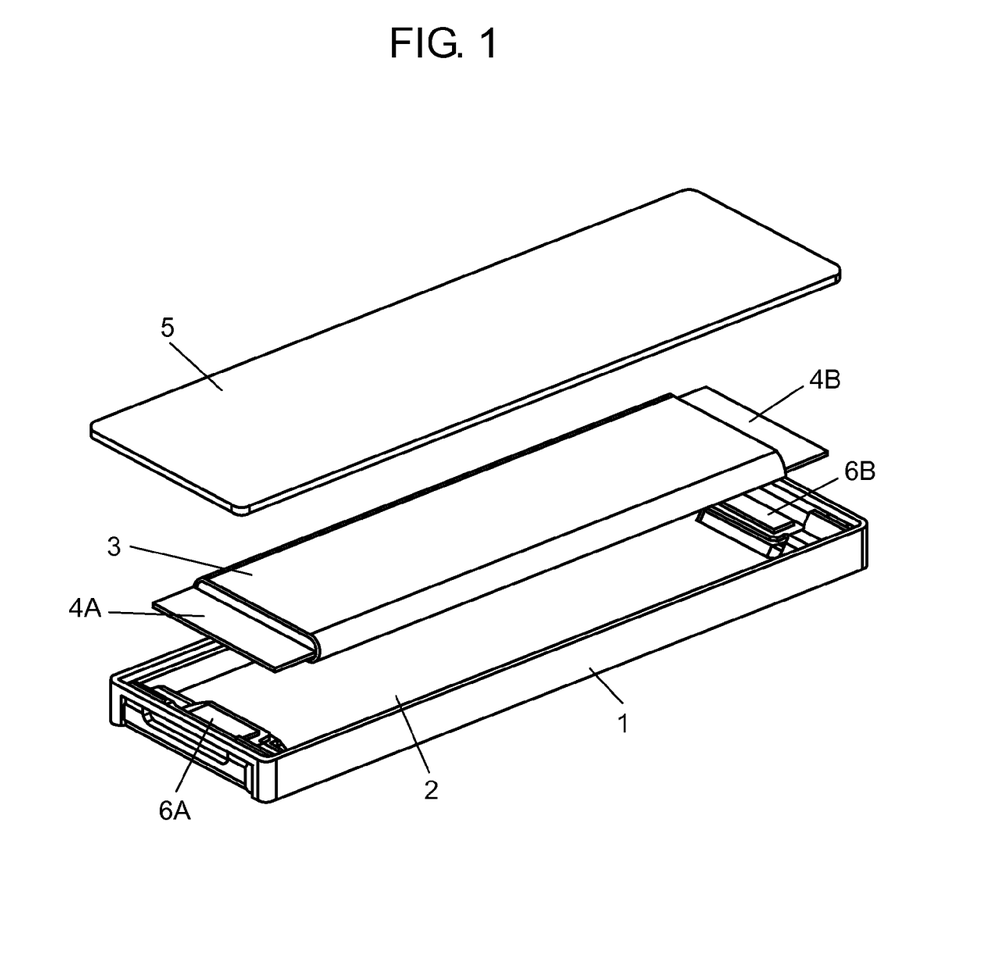
FIG. 1 is an exploded perspective view of a capacitor according to an embodiment of the present invention.

FIG. 1 is an exploded perspective view of a capacitor according to an embodiment of the present invention. FIG.

Figure 3A:
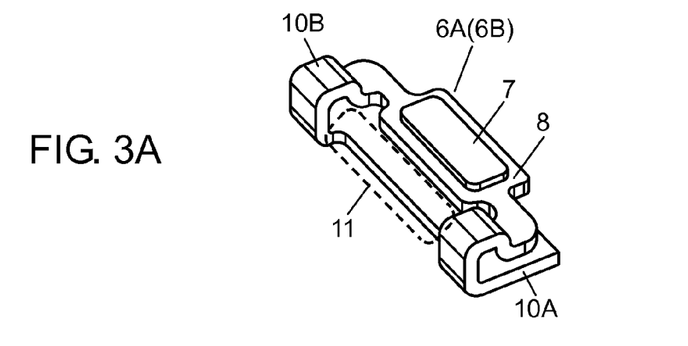
FIG. 3A is a perspective view of a terminal of the capacitor shown in FIG. 1.
Figure 3B:
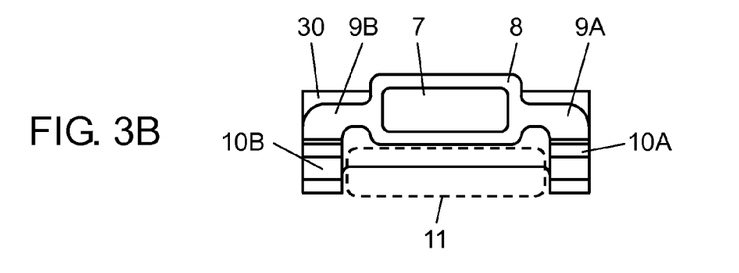
FIG. 3B is a top view of the terminal shown in FIG. 3A.
Figure 3C:
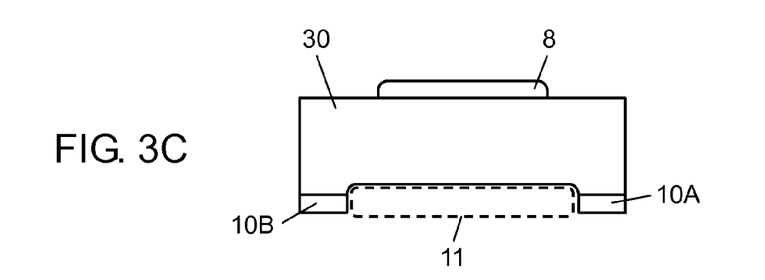
FIG. 3C is a bottom view of the terminal shown in FIG. 3A.
Figure 3D:
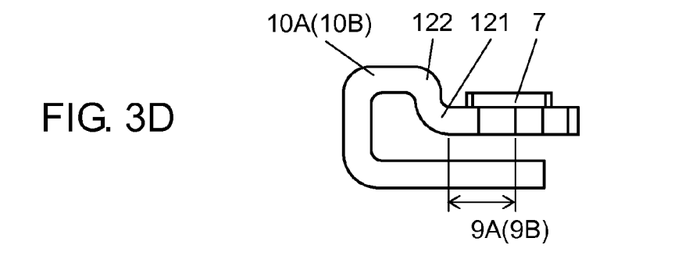
FIG. 3D is a side view of the terminal shown in FIG. 3A.
Figure 4A:
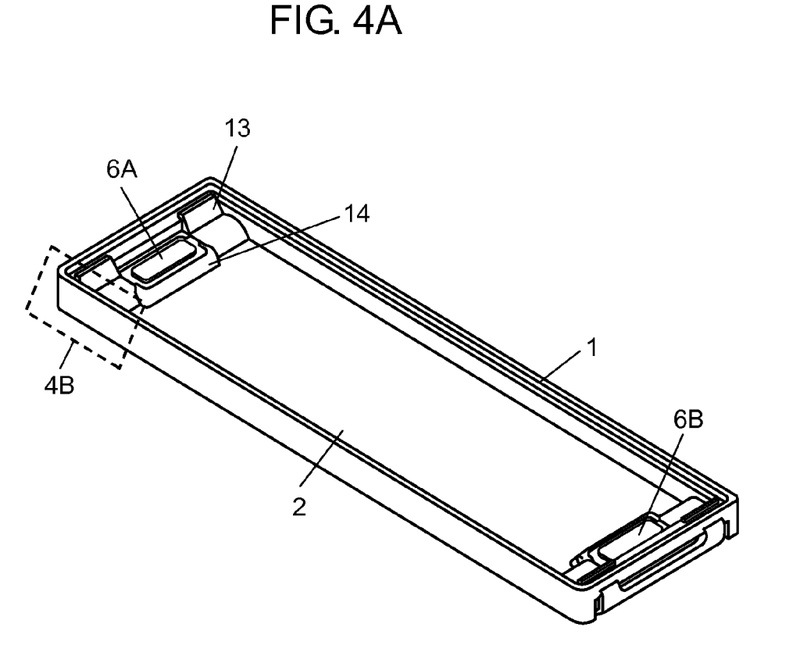
FIG. 4A is a perspective view of a case in which the terminals are embedded, of the capacitor shown in FIG. 1.
Figure 4B:
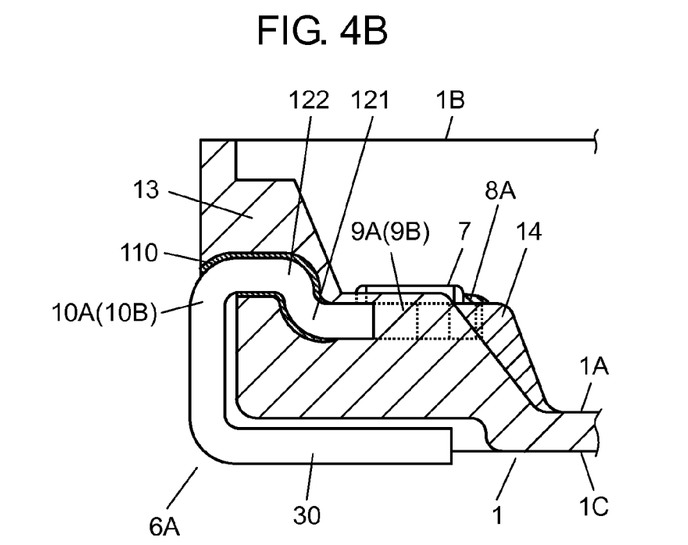
FIG. 4B is a sectional view of the case shown in FIG. 4A, taken along the broken line 4B.

2A is a perspective view of a capacitor element of the capacitor shown in FIG. 1. FIG. 2B is a sectional view of the capacitor element shown in FIG. 2A, taken along the line 2B-2B. FIGS. 3A through 3D show a terminal of the capacitor shown in FIG. 1. FIG. 3A is a perspective view, FIG. 3B is a top view, FIG. 3C is a bottom view, and FIG. 3D is a side view. FIG. 4A is a perspective view of a case in which the terminals are embedded, of the capacitor shown in FIG. 1. FIG. 4B is a sectional view of the case shown in FIG. 4A, taken along the broken line 4B. In this embodiment, a description is made of an electric double layer capacitor as a capacitor of the present invention.

As shown in FIG. 1, this capacitor includes capacitor element 3 having a pair of electrode lead sections 4A, 4B, an electrolyte (not shown) impregnated in capacitor element 3, resin-made case 1, cover 5, and a pair of terminals 6A, 6B. Containing chamber 2 provided in case 1 contains capacitor element 3 together with the electrolyte (not shown). As shown in FIG. 4B, case 1 has inner bottom 1A, open surface 1B facing inner bottom 1A, and outer bottom 1C which is on the other side of inner bottom 1A. Terminal 6A disposed in case 1 is joined to electrode lead section 4A of capacitor element 3 and terminal 6B disposed in case 1 is joined to electrode lead section 4B of capacitor element 3. Further, the top surface of containing chamber 2 is covered with plate-like cover 5 to be sealed, thereby forming an electric double layer capacitor. That is, cover 5 is combined to open surface 1B of case 1.

Figure 2A:
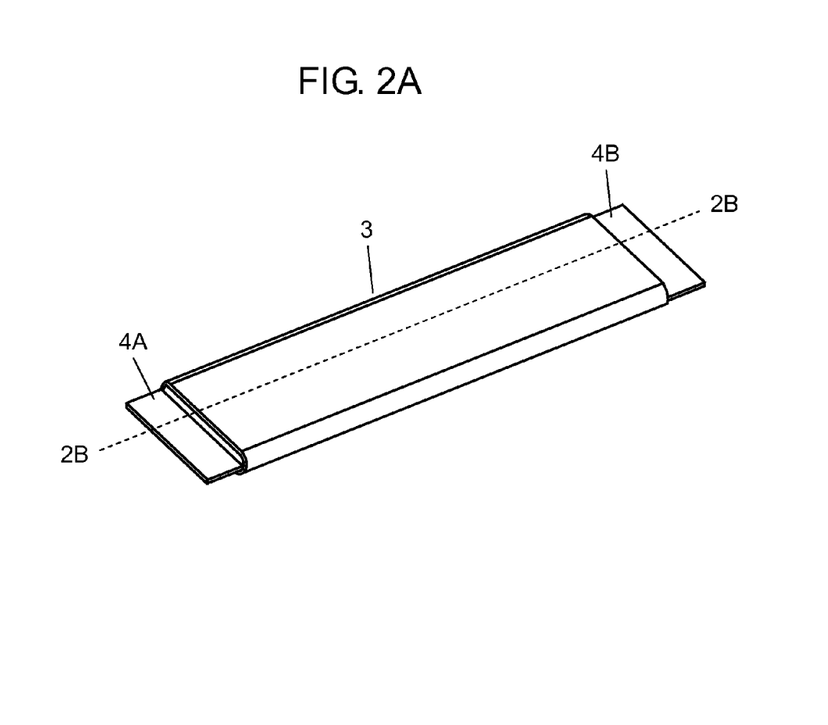
FIG. 2A is a perspective view of a capacitor element of the capacitor shown in FIG. 1.
Figure 2B:
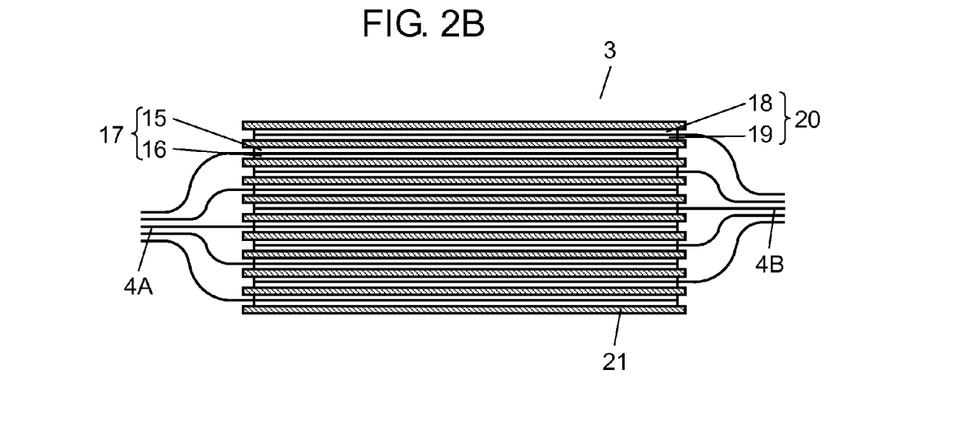
FIG. 2B is a sectional view of the capacitor element shown in FIG. 2A, taken along the line 2B-2B.

Next, a description is made of the makeup of capacitor element 3 in reference to FIGS. 2A and 2B. In FIG. 2B, the structure is simplified to some extent to be easily understood.

As shown in FIG. 2A, capacitor element 3 has a flat shape. Electrode lead section 4A for the positive electrode and electrode lead section 4B for the negative electrode are respectively led out of the end surfaces of capacitor element 3 opposite each other. As shown in FIG. 2B, capacitor element 3 is composed of positive electrode 17, negative electrode 20, and separator 21. Positive electrode 17 includes current collector 15 made of aluminum foil, and polarized electrode layer 16 formed on a part except for an exposed part provided at one end of current collector 15. Negative electrode 20 includes current collector 18 made of aluminum foil, and polarized electrode layer 19 formed on a part except for an exposed part provided at one end of current collector 18. Positive electrode 17 and negative electrode 20 are overlaid with separator 21 placed therebetween so that the exposed parts provided separately are in directions opposite each other, and then are wound. In FIG. 2B, the exposed part of positive electrode 17 is disposed on the left, the exposed part of positive electrode 20 is disposed on the right.

To produce such capacitor element 3, positive electrode 17 and negative electrode 20 are overlaid with separator 21 placed therebetween as described above to form a laminated body, and then the laminated body is wound such as with an appropriate plain plate as a core to produce a wound body. At this moment, each exposed part of positive electrode 17 and negative electrode 20 is made exposed from each end surface opposite the other so as to form electrode lead sections 4A, 4B from each of the exposed parts.

Next, the plain plate as a core is pulled out, and a fixing tape (not shown) is wound around the outer periphery of the wound body. Further, electrode lead section 4A led out of one end is pressed vertically. In the same way, electrode lead section 4B extracted from the other end is pressed vertically.

As shown in FIGS. 2A and 2B, the above-described procedure completes coiled, flat capacitor element 3 provided with electrode lead sections 4A, 4B from each end surface opposite the other.

Polarized electrode layers 16, 19 respectively formed in positive electrode 17 and negative electrode 20 are produced by kneading activated carbon powder, carbon black, and a binder. The activated carbon powder can be produced by activating a raw material based on such as wood flour, coconut shell, phenol resin, petroleum coke, coal coke, and pitch. As the binder, a mixture of a water-soluble binder such as carboxymethyl cellulose with a substance such as polytetrafluoroethylene can be used.

Separator 21 is desirably made of cellulosic fiber or synthetic fiber. This is because such fibers have superior heat resistance. Concretely, examples of the cellulosic fiber include cellulose, rayon, kraft, Manila hemp, hemp, and esparto. Examples of the synthetic fiber include polypropylene, polyethylene, polyamide, polybutylene-terephthalate, polycarbonate, polyacetal, modified polyphenylene oxide, polyphenylene-sulfide, polyetheretherketone, polyethersulfone, polysulfone, polyamide-imide, polyether-imide, polyimide, polyallylate, polyallylethernitrile, polytetrafluoroethylene, polyester resin, vinylon resin, polyamide resin, aromatic polyamide resin, polyimide resin, polyamide-imide resin, and fluororesin. What is especially preferable is aromatic polyamide resin, polyimide resin, polyamide-imide resin, or fluororesin.

For the electrolyte contained together with capacitor element 3, its solvent can be one of, or a mixture of two or more of the substances: propylene carbonate, γ-butyrolactone, ethylene carbonate, sulfolane, acetonitrile, dimethyl carbonate, diethyl carbonate, and methyl ethyl carbonate. As the electrolyte cations, quaternary ammonium, quaternary phosphonium, or imidazolium salt can be used. The electrolyte anion can be $BF_4^-$, $PF_6^-$, $ClO_4^-$, $CF_3SO_3^-$, or $N(CF_3SO_2)_2^-$.

The electrolyte is injected into containing chamber 2 before cover 5 is joined to case 1. Alternatively, the next way may be used. That is, a hole (not shown) for injecting an electrolyte is provided in the side of case 1 after case 1 is sealed with cover 5, an electrolyte is injected, and then the hole is closed (sealed).

A material used for case 1 and cover 5 is needed to be low in moisture permeability and to be capable of discharging a gas generated inside to the outside. This is because this type of capacitor has the following property. That is, if water enters the inside of the capacitor, electrolysis of the water generates a gas, thereby causing performance deterioration, even destruction in the worst case. Hence, a preferable resin for case 1 and cover 5 is particularly liquid crystal polymer. A resin such as PEEK (polyetheretherketone) and polyamide can be used for a material of case 1 and cover 5; however, liquid crystal polymer is more preferable because it is two or more digits lower in moisture permeability than the others.

Meanwhile, capacitor element 3 is not produced only by the above-described way. For instance, flat capacitor element 3 may be produced by making a cylinder-shaped capacitor element using a rod-shaped core and flatly press the element.

Before winding a fixing tape, an insulating paper (not shown) may be wound around the outer periphery of a wound body. An insulating paper may be used optionally as appropriate. Further, after a fixing tape is wound, a stainless-steel sheet (not shown) may be wound. This structure effectively prevents capacitor element 3 from expanding while used. Stainless-steel does not change the characteristics of a capacitor because it has high chemical resistance against an electrolyte.

Next, a description is made of terminals 6A, 6B referring to FIGS. 3A through 3D. The structure of terminal 6B is the same as that of terminal 6A, thus the following description focuses on terminal 6A.

Terminal 6A made of aluminum, as shown in FIG. 3A, has joint 8 including joint surface 7, first and second intermediate conductive sections 9A, 9B, and first and second terminal sections 10A, 10B. Joint surface 7 is in contact with and joined with electrode lead section 4A of capacitor element 3. Meanwhile, joint surface 7 of terminal 6B is in contact with and joined with electrode lead section 4B of capacitor element 3. First and second intermediate conductive sections 9A, 9B are extendedly disposed in an L shape in directions parallel with joint surface 7 and opposite to each other from both ends of joint 8. First terminal section 10A is disposed further extendedly from first intermediate conductive section 9A. Second terminal section 10B is disposed further extendedly from second intermediate conductive section 9B and placed symmetrically to first terminal section 10A about joint 8.

Terminal 6A further includes joint portion 30 linking to the ends of first and second terminal sections 10A, 10B, at portions which are exposed outside case 1. Joint 30 is a part connecting the capacitor to a wiring pattern of a circuit board, and is substantially rectangular as shown in FIG. 3C. Here, the shape of joint portion 30 is not particularly limited to a rectangle. Joint 30 does not necessarily need to be provided. Joint surface 7, joint 8, intermediate conductive sections 9A, 9B, terminal sections 10A, 10B, and joint portion 30 are molded integrally.

Joint 8 and joint portion 30 are placed facing each other, vertically parallel with each other with a given distance. Hence, hollow 11 exists between joint 8 and joint portion 30, namely between first terminal section 10A and second terminal section 10B. In FIGS. 3A through 3C, hollow 11 is indicated by a broken line.

As shown in FIG. 3B, joint 8 is substantially rectangular and its outer periphery is chamfered. The substantially central part of joint 8 is provided with substantially rectangular joint surface 7. Joint surface 7 projects upward (in a direction approaching cover 5) from joint 8. Joint surface 7 is a part in contact with and joined with one of electrode lead sections 4A, 4B of capacitor element 3. Providing joint surface 7 convexly on joint 8 facilitates contacting electrode lead sections 4A, 4B. In this embodiment, joint surface 7 is substantially rectangular, but not particularly limited to the shape.

In this embodiment, aluminum is used for a material forming terminals 6A, 6B; however, the present invention is not limited to aluminum, but any material may be used as long as it is conductive, such as stainless-steel, copper, copper alloy, nickel, and iron.

As shown in FIG. 3D, first terminal section 10A is bent at some points thereof. So is second terminal section 10B, and thus first terminal section 10A is described representatively. Concretely, first terminal section 10A includes first bend 121 and second bend 122. At first bend 121, first terminal section 10A is bent so as to protrude in an L shape upward from first intermediate conductive section 9A. At second bend 122, first terminal section 10A is bent so as to be parallel to joint 8. Accordingly, first terminal section 10A is partially positioned above joint 8 (closer to cover 5). In this way, terminal sections 10A, 10B are partially bent to form bends 121, 122 protruding toward open surface 1B of case 1.

Next, FIGS. 4A, 4B show case 1 in which terminals 6A, 6B are embedded. FIG. 4A is a perspective view of case 1. FIG. 4B is a sectional view of case 1 shown in FIG. 4A, taken along the broken line 4B. Terminals 6A, 6B are provided integrally with case 1 by insert molding and disposed at both ends of containing chamber 2 of case 1. Here, a state of terminal 6B embedded is the same as terminal 6A, and thus only terminal 6A is described hereinafter.

As shown in FIG. 4B, joint surface 7 of terminal 6A is exposed from the resin of case 1 and is in a state projecting toward cover 5. This structure allows electrode lead section 4A of capacitor element 3 to reliably contact joint surface 7.

The rim of joint 8 and intermediate conductive sections 9A, 9B extendedly disposed from joint 8 of terminal 6A are embedded with the resin of case 1. Consequently, mold 13 is formed inside containing chamber 2 as shown in FIG. 4A. As shown in FIG. 4B, first bend 121 and a part of second bend 122 are embedded in mold 13. Further, since hollow 11 exists between joint 8 and joint portion 30, and simultaneously between terminal sections 10A and 10B, step part 14 is formed under joint 8.

Then, terminal sections 10A, 10B are partially guided outside from the side of case 1 at a position above joint 8 (closer to cover 5). In this way, the rim of joint 8 and intermediate conductive sections 9A, 9B are embedded in case 1, and portions of terminal sections 10A, 10B are guided outside from case 1. Then, joint portion 30 linking the ends of terminal sections 10A, 10B is disposed at outer bottom 1C of case 1.

Meanwhile, as shown in FIG. 4B, coating layer 8A may be provided using fluororesin at the interface covered with resin near the outer periphery of joint 8. Still, coating layer 110 may be provided using fluororesin at terminal sections 10A, 10B at portions guided outside from the side of case 1. Self-adhesive fluororesin facilitates coating work. Further, fluororesin increases airtightness (sealing performance) inside containing chamber 2 and prevents an electrolyte from leaking outside case 1 effectively. A material of coating layers 8A, 110 is not limited to fluororesin, but may be liquid butyl rubber and liquid fluoroelastomer, for example. As liquid butyl rubber is low in gas transmittance, it increases airtightness inside containing chamber 2.

In the capacitor of this embodiment, intermediate conductive sections 9A, 9B are embedded with the resin of case 1, together with the rim of joint 8. Consequently, even if the inner pressure of containing chamber 2 increases, the interface (i.e. joint surface 7) as a starting point of a leak path is unlikely to be influenced by deformation of case 1. Since joint surface 7 is provided at such a position, joint 8 and intermediate conductive sections 9A, 9B are not influenced by a stress imposed on the inside of case 1 when the internal pressure inside case 1 increases, which less influences terminal section 10A.

Terminal section 10A is bent so as to protrude upward at first bend 121 and further so as to be parallel to joint 8 at second bend 122. Several bends thus provided on terminal section 10A increases the distance of a leak path where terminal section 10A extends from the inside of containing chamber 2 to the outside of case 1. This structure reduces the possibility that an electrolyte leaks from containing chamber 2 to the outside of case 1. As terminal sections 10A and 10B are bent in an arc shape at each bend, the shape reduces the possibility that terminal 6A is deformed when an external force is imposed on the capacitor.

Furthermore, the resin enters hollow 11 between terminal sections 10A and 10B, which are guided out from the side of case 1. Herewith, resin on the side of case 1 from which terminal sections 10A, 10B are guided out is formed thickly, thereby increasing the strength of the side, and terminal sections 10A, 10B are tightly supported with the resin of case 1. This alleviates a stress imposed on terminal sections 10A, 10B guided out from the side of case 1. Still, terminal sections 10A, 10B are guided out from separate two portions on the side of case 1, which further alleviates the stress imposed on terminal sections 10A, 10B. Consequently, terminal 6A is not influenced by a stress imposed on the inside of case 1 when the internal pressure inside case 1 increases. Hence, a gap is unlikely to occur at an interface between case 1 and terminal 6A, which reduces the possibility that an electrolyte inside case 1 leaks, thereby improving the reliability of the capacitor.

Then, joint portion 30 linking the ends of terminal sections 10A, 10B increases the strength of solder bonding when the sections are mounted on a wiring pattern of a circuit board. If joint portion 30 is not provided, each end of terminal sections 10A, 10B has only to be mounted on a wiring pattern of a circuit board. Joint 30, however, is preferably provided because bonding strength is increased as described above.

Figure 5A:
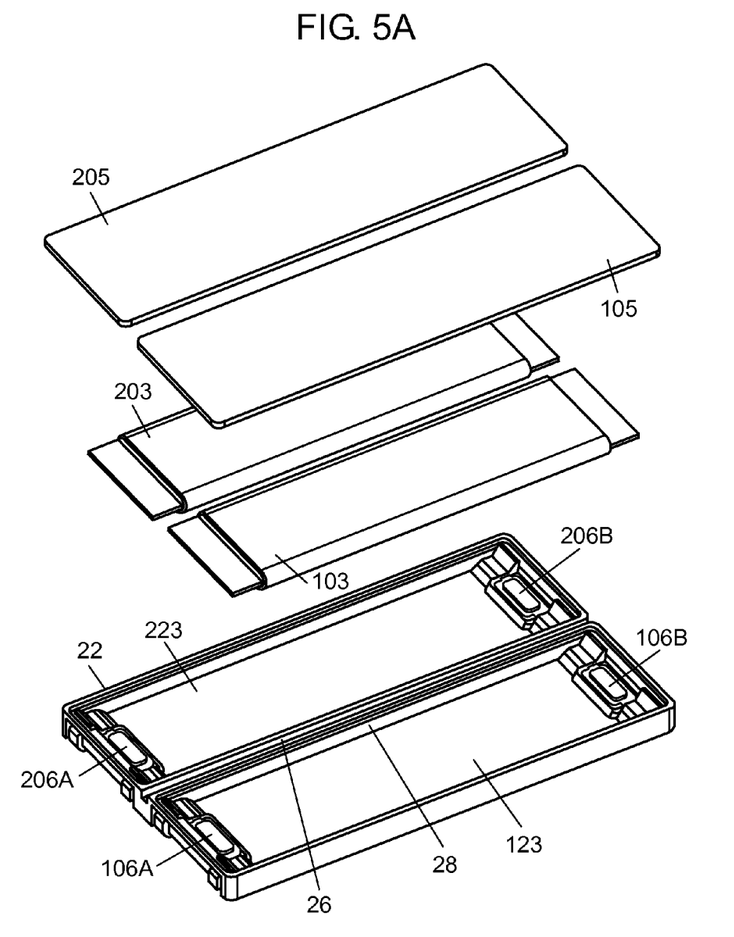
FIG. 5A is an exploded perspective view of a capacitor that contains two capacitor elements shown in FIG. 2A in the case, according to an embodiment of the present invention.
Figure 5B:
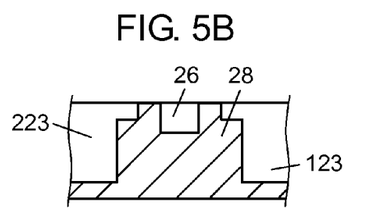
FIGS. 5B and 5C are sectional views of essential parts of the capacitor case shown in FIG. 5A.
Figure 5C:
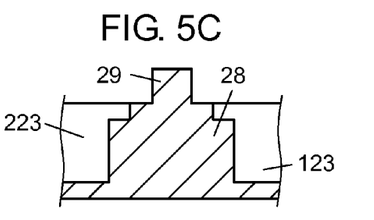
Figure 6A:
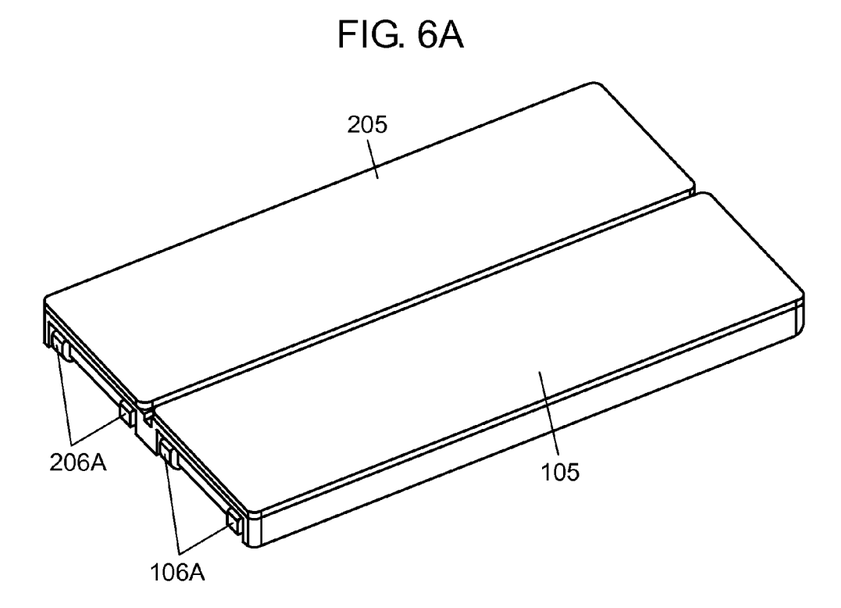
FIG. 6A is a top-side perspective view of the capacitor shown in FIG. 5A.
Figure 6B:
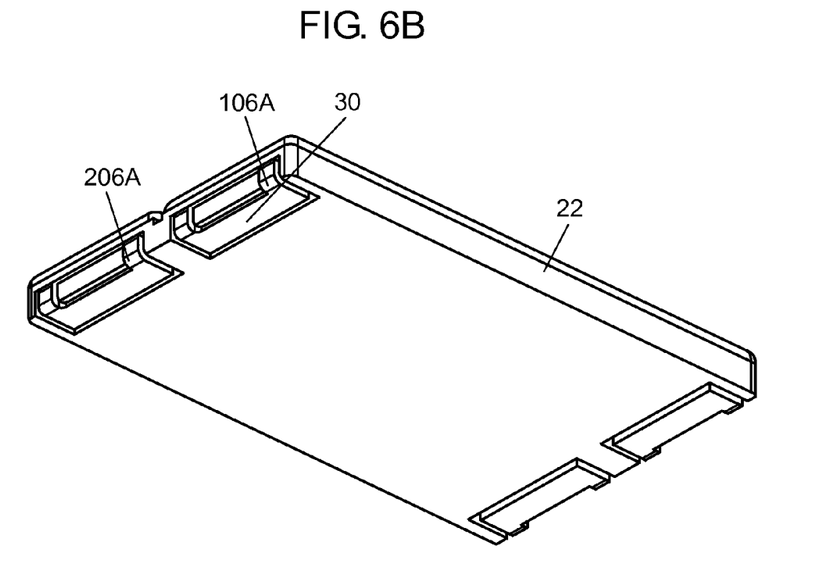
FIG. 6B is a bottom-side perspective view of the capacitor shown in FIG. 5A.

Next, a description is made of a configuration of another capacitor according to the embodiment, referring to FIGS. 5A through 6B. FIG. 5A is an exploded perspective view of a capacitor produced by containing two capacitor elements shown in FIG. 2A, in a case. FIGS. 5B and 5C are sectional views of essential parts of the case of the capacitor shown in FIG. 5A. FIG. 6A is a top surface perspective view of the capacitor, and FIG. 6B is a bottom surface perspective view.

As shown in FIG. 5A, this capacitor includes capacitor elements 103, 203, case 22, covers 105, 205, terminals 106A, 106B, and terminals 206A, 206B. Case 22 is provided with separating wall 28 partitioning the inside of case 22 into containing chambers 123, 223. Capacitor elements 103, 203 together with an electrolyte (not shown) are independently contained in respective containing chambers 123, 223. The electrode lead sections of capacitor element 103 are respectively connected to terminals 106A, 106B, and the electrode lead sections of capacitor element 203 are respectively connected to terminals 206A, 206B. Containing chambers 123, 223 have respective open surfaces, and covers 105, 205 are independently joined to the respective open surfaces of containing chambers 123, 223. Otherwise, the basic configuration is the same as that of the capacitor shown in FIG. 1, and the structures of terminals 106A through 206B and their peripheries are the same as those of terminal 6A.

Capacitor elements 103, 203 contained in containing chambers 123, 223 may be connected either in series or in parallel. The connection mode can be changed as appropriate according to a wiring pattern formed on a circuit board (not shown) on which this capacitor is mounted.

The surface (top surface) of separating wall 28 interposed between the open surfaces of adjacent containing chambers 123, 223 is provided therein with groove 26 as shown in FIGS. 5A and 5B. Groove 26 prevents an electrolyte inside containing chamber 123, when leaking from a joint between case 22 and cover 105, from entering containing chamber 223. In other words, even if an electrolyte inside containing chamber 123 leaks from chamber 123 due to any cause, the electrolyte drops into groove 26 before reaching adjacent containing chamber 223, and stays in groove 26. The situation is the same for the opposite case, and thus groove 26 prevents an electrolyte having leaked from containing chamber 223 from entering containing chamber 123.

In the same way as in the capacitor shown in FIG. 1A, terminals 106A through 206B are provided integrally with case 22 by insert molding and disposed at both ends of containing chambers 123, 223 of case 22. Further, terminals 106A through 206B are disposed along the side wall surface of case 22 as shown in FIGS. 6A and 6B, and joint portion 30 is disposed at the outer bottom of case 22. Joint 30 projecting from the outer bottom of case 22 can be easily connected to a wiring pattern on a circuit board. Here, examples of the above-described wiring pattern include a land pattern formed on a circuit board, where the land pattern is connected to joint portion 30 by soldering, for example.

In this way, with the capacitor shown in FIG. 5A, groove 26 prevents an electrolyte from entering an adjacent containing chamber. This reduces the possibility of a liquid junction of an electrolyte resulting from liquid leakage. Meanwhile, as shown in FIG. 5C, projecting wall 29 projecting upward, instead of groove 26, may be provided on the top surface of separating wall 28. With this structure as well, projecting wall 29 prevents an electrolyte having leaked from a containing chamber from entering an adjacent containing chamber, which provides the same effect as groove 26.

Connecting capacitor elements 103, 203 in series easily implements a high withstand voltage of the capacitor.

In FIG. 5A, two containing chambers are formed to contain two capacitor elements independently. However, two or more separating walls 28 may be formed to contain three or more capacitor elements independently.

In this embodiment, the description is made of an electric double layer capacitor as an example; however, the present invention is applicable to any capacitor as long as it uses an electrolyte, such as to an electrolytic capacitor and to a battery as well. Still more, the present invention allows reducing moisture penetrating into a capacitor from outside.

As described above, the structure of a capacitor of the present invention allows reducing the possibility that an electrolyte leaks outside the case, thereby improving reliability. Therefore, a capacitor of the present invention suitably functions for assisting power sources of various types of electronic, electric, and mobile devices.

What is claimed is:

1. A capacitor comprising:
a capacitor element having a pair of electrode lead sections;
an electrolyte impregnated in the capacitor element;
a resin-made case containing the capacitor element and the electrolyte, and having an inner bottom and an open surface facing the inner bottom;
a cover combined with the open surface of the case; and
a pair of terminals to which the pair of electrode lead sections of the capacitor element are joined respectively,
wherein each of the pair of terminals includes:
a joint having a joint surface to which one of the electrode lead sections of the capacitor element is joined;
L-shaped first and second intermediate conductive sections extendedly disposed in directions parallel with the joint surface and opposite to each other from both ends of the joint;
a first terminal section disposed further extendedly from the first intermediate conductive section;
a second terminal section disposed further extendedly from the second intermediate conductive section and placed symmetrically to the first terminal section about the joint,
wherein the joint surface of the joint is disposed closer to the open surface than to the inner bottom of the case and is exposed from the case toward the open surface,
a rim of the joint and the first and second intermediate conductive sections are embedded in the case, and
the first and second terminal sections are partially guided outside from the case.

2. The capacitor according to claim 1,
wherein each of the pair of terminals further includes a joint portion linking ends of the first and second terminal sections outside the case,
the case includes an outer bottom opposite the inner bottom, and
the joint portion is disposed at the outer bottom of the case.

3. The capacitor according to claim 1,
wherein the first and second terminal sections are partially bent to form a bend protruding toward the open surface of the case.

4. The capacitor according to claim 1,
wherein the joint surface of each terminals is formed closer to the open surface than to a rim of the joint, and
the capacitor further includes a coating layer coating a boundary between the rim of the joint and the case.

5. The capacitor according to claim 1, further comprising a separating wall partitioning an inside of the case into a plurality of containing chambers,
wherein each of the plurality of containing chambers has an open surface,
the capacitor element is one of a plurality of capacitor elements, the plurality of capacitor elements independently contained in the respective containing chambers, and
the cover is one of a plurality of covers, the plurality of covers independently joined to the respective open surfaces of the plurality of containing chambers.

6. The capacitor according to claim 5,
wherein one of a groove and a projecting wall is provided on a surface of the separating wall interposed between open surfaces of the adjacent containing chambers.

\* \* \* \* \*